United States Patent
Braun et al.

(10) Patent No.: US 9,942,342 B2
(45) Date of Patent: Apr. 10, 2018

(54) SYSTEM AND METHOD FOR PROVIDING DATABASE CONTENT ON A CLIENT DEVICE

(71) Applicant: SkyGiraffe, Inc., San Bruno, CA (US)

(72) Inventors: Itay Braun, Shaffir (IL); Boaz Hecht, Tel Aviv (IL)

( * ) Notice: Subject to any disclaimer, the term of this patent is extended or adjusted under 35 U.S.C. 154(b) by 312 days.

(21) Appl. No.: 14/733,337

(22) Filed: Jun. 8, 2015

(65) Prior Publication Data

US 2015/0358424 A1 Dec. 10, 2015

Related U.S. Application Data

(60) Provisional application No. 62/009,341, filed on Jun. 9, 2014.

(51) Int. Cl.
*H04L 29/08* (2006.01)
*G06F 17/30* (2006.01)

(52) U.S. Cl.
CPC ........ *H04L 67/28* (2013.01); *G06F 17/30424* (2013.01); *G06F 17/30864* (2013.01); *H04L 67/1004* (2013.01)

(58) Field of Classification Search
CPC .................. H04L 67/28; H04L 67/1004; G06F 17/30424; G06F 17/30864
USPC ........................................................ 709/219
See application file for complete search history.

(56) References Cited

U.S. PATENT DOCUMENTS

| | | | |
|---|---|---|---|
| 6,694,359 B1 | 2/2004 | Morris et al. | |
| 6,694,366 B1 | 2/2004 | Gernert et al. | |
| 7,093,194 B2 | 8/2006 | Nelson | |
| 7,548,878 B2 | 6/2009 | Norrie | |
| 7,640,496 B1 | 12/2009 | Chaulk et al. | |
| 7,698,629 B2 | 4/2010 | Belinson | |
| 7,949,937 B2 | 5/2011 | Wu | |
| 2013/0332004 A1* | 12/2013 | Gompert | G07C 5/008 701/1 |
| 2014/0195602 A1 | 7/2014 | Carricarte et al. | |
| 2014/0279901 A1 | 9/2014 | Agrawal et al. | |
| 2014/0279910 A1 | 9/2014 | Prasanna et al. | |

* cited by examiner

*Primary Examiner* — Tu Nguyen
(74) *Attorney, Agent, or Firm* — Fletcher Yoder PC

(57) ABSTRACT

A system and method for providing content for display from data sources on a client device are provided. The method includes receiving, by a distribution server, a report identifier associated with a report and a request for information, wherein the information is requested based on the report; determining by the distribution server at least a data source, the at least a data source storing at least a portion of the information; requesting access from the integration server to the at least a data source to retrieve the at least a portion of the information; and sending from the distribution server to the client device, the at least a portion of the information, wherein the at least a portion of information is utilized in the report. In an embodiment, the data sources are accessible by an integration server.

15 Claims, 3 Drawing Sheets

SYSTEM AND METHOD FOR PROVIDING DATABASE CONTENT ON A CLIENT DEVICE

CROSS-REFERENCE TO RELATED APPLICATIONS

This application claims the benefit of U.S. Provisional Application No. 62/009,341 filed on Jun. 9, 2014, the contents of which are hereby incorporated by reference.

TECHNICAL FIELD

The present disclosure relates generally to displaying data source content and, particularly, to displaying data source content as reports on an authorized client device.

BACKGROUND

In many organizations, data respective of the organizations operation is held on central data sources which allow a plurality of users varying levels of access. The users typically need to access certain reports as part of their day to day activities. Different groups and sub-groups of users may need to access different data from one or more data sources throughout each day. A further complication to providing the data to the users is the variety of client devices in which the user may view reports generated respective of the data, as not all client devices are uniform in their display capabilities. This lack of uniformity can cause the presentation of such reports to appear disorganized.

It is desirable to send to the client device the most up-to-date data for generating a report while refraining from compromising the security level of the data sources from which the data is remotely accessed. It is further desirable to ensure that such data is delivered in an optimally efficient manner with respect to the type of user device accessing the data and information required by a user.

It would therefore be advantageous to provide a solution that would overcome the deficiencies of the prior art by providing optimized secure access to information stored in a data source respective of a request for a report identifier from a client device.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Some exemplary embodiments disclosed herein include a system and method for providing content for display from data sources on a client device. The method includes receiving, by a distribution server, a report identifier associated with a report and a request for information, wherein the information is requested based on the report; determining by the distribution server at least a data source, the at least a data source storing at least a portion of the information; requesting access from the integration server to the at least a data source to retrieve the at least a portion of the information; and sending from the distribution server to the client device, the at least a portion of the information, wherein the at least a portion of information is utilized in the report. In an embodiment, the data sources are accessible by an integration server.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
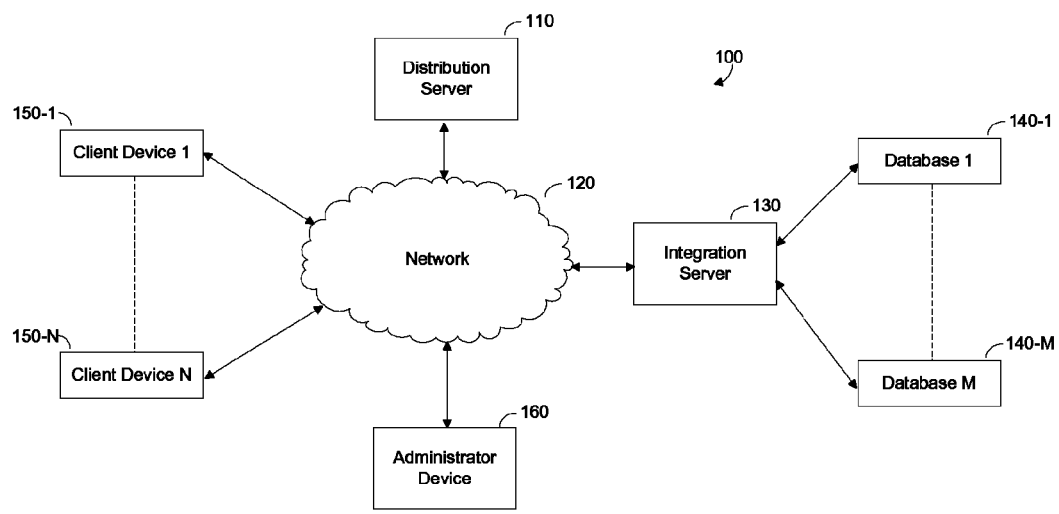
FIG. 1 is a network diagram illustrating a distribution server communicatively connected to a network according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for displaying database content from data sources on a client device. A report template identifier is received, from a client device, and a request for information is further received, the information respective of a report associated with the report identifier. At least a data source is determined, the at least a data source storing at least a portion of the information. The at least a data source is accessed to retrieve the at least a portion of the information and the at least a portion of the information is sent to the client device. The client device may be communicatively connected to a distribution server, the distribution server configured to perform the methods disclosed herein. In certain embodiments, an integration server, which is communicatively connected to the distribution server, is used to access the at least a data source.

FIG. 1 shows an exemplary and non-limiting network diagram illustrating distribution server 110 communicatively connected to a network 120 in accordance with an embodiment. The network 120 is configured to provide wired and/or wireless connectivity, including, for example, local area network (LAN), wide area network (WAN), metro area network (MAN), worldwide web (WWW), Internet, and any combination thereof, as well as cellular connectivity.

The network 120 is further communicatively connected to an administrator device 160, an integration server 130, and client devices 150-1 through 150-N, where N is an integer having a value of 1 or greater (hereinafter referred to individually as a client device 150 and collectively as client devices 150, merely for simplicity). The integration server 130 is communicatively connected to data sources 140-1 through 140-M, where M is an integer having a value of 1 or greater (hereinafter referred to individually as a data source 140 and collectively as data sources 140, merely for simplicity). In certain embodiments, each data source 140 may be a relational database, a non-relational database, a web service, a list of comma-separated values (CSV), an image cache, and so on.

In certain embodiments, the distribution server 110 and the integration server 130 may be implemented on a single machine. Each client device 150 contains at least a template of a report for which the client is authorized and an associated report identifier. The at least a template may be customized via an administrator device 160 for use in one or more types of client devices. In an embodiment, the report identifier may further include a report version number (e.g., 1.0, 2.0, 3.5, 4.1, and so on). Such a report version number may be utilized to determine whether the report is up to date. As a non-limiting example, if the report version number of a report stored on the client device 150 is Version 1.0, but the latest version accessible to the distribution server 110 is Version 2.0, then the report on the client device 150 is out of date.

A template includes at least a data field. The template may further include a visualization of the report and a list of functions to be performed on the report. Information used to fill in the at least a data field of the template is stored on one or more of the data sources 140. In certain embodiments, different sub-groups of client devices may be authorized to store different reports and associated report identifiers.

The distribution server 110 includes a list of user identifiers, the user identifiers each having at least a permission or an authorization to access at least a report or a portion thereof. Each user identifier may be associated with one or more client devices 150. A client device 150 is authorized to access a report or portion thereof when it is associated with a user identifier which is authorized to access that report or portion. Authorization may be altered by instructions received from the administrator device 160.

The distribution server 110 may further include a memory (not shown) for storing frequently accessed data from one or more of the data sources 140. Whether data is accessed frequently may be determined by a threshold. The threshold may be static, dynamic or adaptive. Static thresholds are predetermined thresholds that remain constant. Dynamic thresholds are forcefully changed, for example, at a certain time of day. Adaptive thresholds are changed in response to changes in characteristics of the accessed data sources and may vary depending on a variety of parameters. In certain embodiments the distribution server 110 is configured to execute methods described herein, such as with respect of FIG. 3. The distribution server 110 requests data from the data sources 140 via the integration server 130. The integration server retrieves data from a data source 140 and sends the data to the distribution server 110. This indirect connection allows for increased security and more efficient conflict resolution when updating data by a client device 150. In an embodiment, the requested data is data that is needed to provide the correct report. In various embodiments, the only requested data is data that is needed to provide the latest version of fields that have been updated or data that is needed to generate graphs, charts, and so on. This selective requesting of data minimizes bandwidth consumption, as data already stored on the client device 150 and/or unnecessary to generate the required portions of the report is not transferred.

In an embodiment, the distribution server 110 may request data at predetermined time intervals (e.g., once every hour, once per day, once per week, and so on). In a further embodiment, the time intervals may be modified based on bandwidth available to the client device 150. For example, if the client device 150 currently has limited bandwidth, the distribution server 110 may request data less frequently to ensure efficient use of bandwidth.

Figure 2:
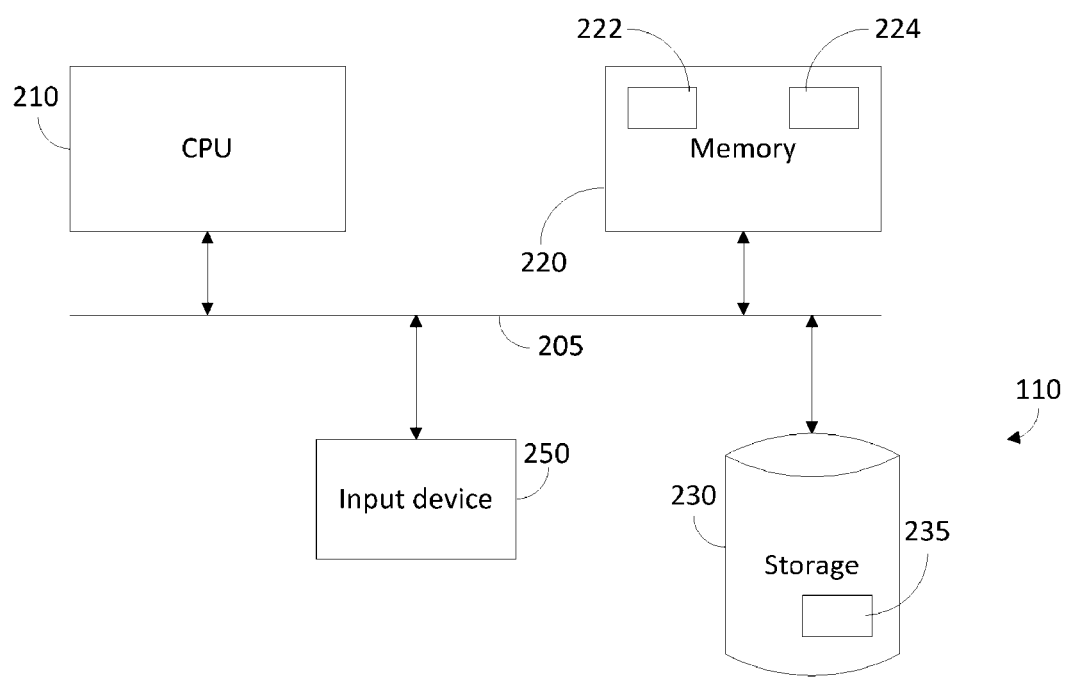
FIG. 2 is a schematic diagram illustrating a distribution server according to an embodiment.

FIG. 2 shows an exemplary and non-limiting schematic diagram of a distribution server 110 implemented according to an embodiment. The distribution server 110 includes at least one processing element 210 which may be, for example, a central processing unit (CPU). The processing element 210 is coupled via a bus 205 to a memory 220. The memory 220 further includes a memory portion 222 that contains instructions that, when executed by the processing element 210, performs the methods described in more detail herein. The memory may be further used as a working scratch pad for the processing element 210, a temporary storage. The memory 220 may be a volatile memory such as, but not limited to random access memory (RAM), or a non-volatile memory (NVM), such as, but not limited to, a Flash memory. The memory 220 may further comprise data portion 224 containing data that is frequently accessed from a data source 140. The processing element 210 may be connected to an input 250. The processing element 210 may be further connected to a storage 230. The storage 230 may be used for the purpose of holding a copy of the method executed in accordance with the disclosed technique. The storage 230 may further include storage portion 235 containing user identifiers, the user identifiers each having a user identifier for determining at least a permission or an authorization to access at least a report. In an embodiment, the server is configured to execute methods described herein with respect of FIG. 3. The method may be hardwired, or may be presented as a series of instructions to be executed by the processing element 210.

Figure 3:
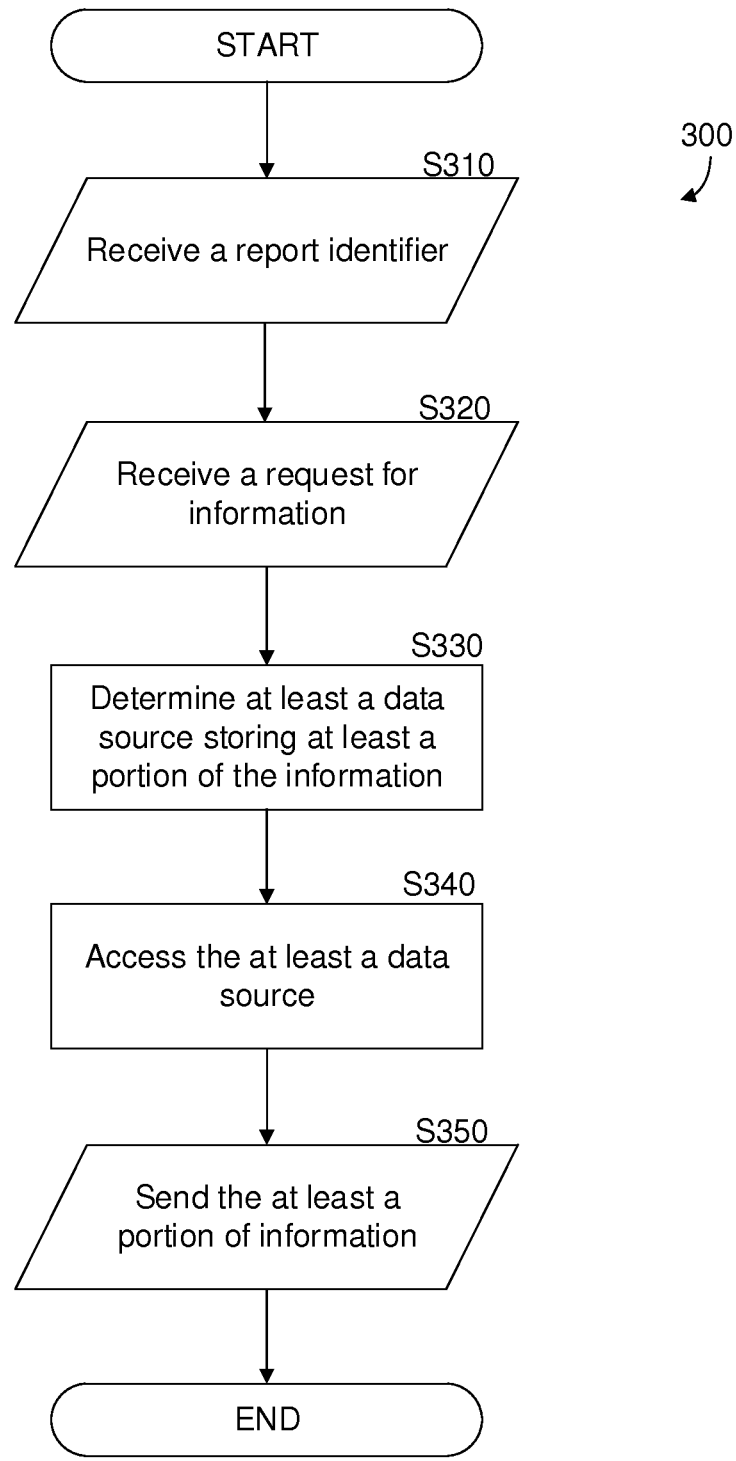
FIG. 3 is a flowchart illustrating a method for displaying database content on a client device according to an embodiment.

FIG. 3 shows an exemplary and non-limiting flowchart 300 illustrating a method for providing information to a client device by a server according to an embodiment. In S310, a report identifier is received from a client device. In S320, a request for information is received from the client device. The information is received respective of a report associated with the report identifier (i.e., the information received is the type of information needed to fill in the report). In S330, at least a data source is determined, the at least a data source storing at least a portion of the information. In S340, the at least a data source is accessed to retrieve the at least a portion of the information. Accessing the at least a data source may further include sending, to an integration server, a request to access the at least a portion of information stored on a data source communicatively connected to the integration server. In S350, the at least a portion of the information is sent to the client device.

This request to access allows for increased security and more efficient conflict resolution when updating data by a client device (e.g., the client device 150). In an embodiment, the requested data is data that is needed to provide the correct report. In various embodiments, the only requested data is data that is needed to provide the latest version of fields that have been updated or data that is needed to generate graphs, charts, and so on. This selective requesting of data minimizes bandwidth consumption, as data already stored on the client device and/or unnecessary to generate the required portions of the report is not transferred.

In an embodiment, data may be requested at predetermined time intervals (e.g., once every hour, once per day, once per week, and so on). In a further embodiment, the time intervals may be modified based on bandwidth available to a client device. For example, if the client device currently has limited bandwidth, data may be requested less frequently to ensure efficient use of bandwidth.

A client device (e.g., the client device 150) may be sent a report and an associated report identifier by a server (e.g., the distribution server 110). Authorization for the client device to receive a report and an associated report identifier may be received from an administrator device. The distribution server may determine, respective of the report identifier, that the report is out of date, for example by providing a report version number. In such a case, the distribution server may synchronize the report with the client device by, for example, sending the client device an updated report template and an associated report identifier. The distribution server may send the client device a request to access all report identifiers of reports stored on the client device. The distribution server may then send updated templates for out-of-date reports and send the respective associated report identifiers. The distribution server may send instructions to delete one or more reports and their associated report identifiers.

In certain embodiments, the distribution server determines a bandwidth between the client device and the distribution server. An optimized method of sending the information to the client device respective of the bandwidth is determined. For example, the method may include determining if the bandwidth is currently above a threshold, and send data-heavy content, such as multi-media files, only then. In certain embodiments, the distribution server stores frequently accessed information. Whether information is accessed frequently may be determined by a threshold. The threshold may be static, dynamic, or adaptive. Static thresholds are predetermined thresholds that remain constant. Dynamic thresholds are forcefully changed, for example, at a certain time of day. Adaptive thresholds are changed in response to changes in characteristics of the accessed data sources and may vary depending on a variety of parameters. In some embodiments, a request to update data in the data source may be received by the distribution server from a client device.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A computerized method for providing content for display from data sources on a client device, wherein the data sources are accessible by an integration server, comprising:
   receiving, by a distribution server, a report identifier associated with a report and a request for information, wherein the information is requested based on the report and wherein the received report identifier includes a report version number;
   determining by the distribution server at least a data source, the at least a data source storing at least a portion of the information;
   requesting access from the integration server to the at least a data source to retrieve the at least a portion of the information, wherein the integration server is connected to the distribution server;
   sending from the distribution server to the client device, the at least a portion of the information, wherein the at least a portion of information is utilized in the report;
   determining a corresponding report identifier stored on the distribution server; and
   sending, to the client device, an updated report upon determination that the received report version number does not match a report version number of the corresponding report identifier.

2. The computerized method of claim 1, further comprising:
   receiving, from an administrator device, an authorization for the client device to receive a new report and a new report identifier associated with the new report.

3. The computerized method of claim 1, further comprising:
   determining a bandwidth between the client device and the distribution server; and
   optimizing, based on the bandwidth, the sending of the at least a portion of the information.

4. The computerized method of claim 1, further comprising:
   receiving, from the client device, a request to update data in the at least a data source.

5. The computerized method of claim 1, wherein each of the at least a data source is any of: a relational database, a non-relational database, a web service, a list of comma-separated values (CSVs), and an image cache.

6. The computerized method of claim 1, further comprising:
   sending, to the client device, an instruction to delete the report and the associated report identifier.

7. The computerized method of claim 1, further comprising:
   determining, based on a threshold, whether the at least a portion of information is frequently accessed; and
   upon determining that the at least a portion of information is frequently accessed, storing, by the distribution server, the at least a portion of information.

8. A non-transitory computer readable medium having stored thereon instructions for causing one or more processing units to execute a method for providing content for display from data sources on a client device, wherein the data sources are accessible by an integration server, the method comprising:
- receiving, by a distribution server, a report identifier associated with a report and a request for information, wherein the information is requested based on the report and wherein the received report identifier includes a report version number;
- determining by the distribution server at least a data source, the at least a data source storing at least a portion of the information;
- requesting access from the integration server to the at least a data source to retrieve the at least a portion of the information, wherein the integration server is connected to the distribution server;
- sending from the distribution server to the client device, the at least a portion of the information, wherein the at least a portion of information is utilized in the report;
- determining a corresponding report identifier stored on the distribution server; and sending, to the client device, an updated report upon determination that the received report version number does not match a report version number of the corresponding report identifier.

9. A system for providing content from data sources on a client device, comprising:
- a distribution server for providing the content from the data sources;
- a processing unit; and
- a memory, the memory containing instructions that, when executed by the processing unit, configure the system to:
  - receive a report identifier associated with a report and a request for information, wherein the information is requested based on the report and wherein the report identifier includes a report version number;
  - determine by the distribution server at least a data source, the at least a data source storing at least a portion of the information;
  - request access from an integration server to the at least a data source to retrieve the at least a portion of the information, wherein the integration server is connected to the distribution server;
  - send to the client device, the at least a portion of the information, wherein the at least a portion of information is utilized in the report;
  - determine a corresponding report identifier stored on the system; and
  - send, to the client device, an updated report upon determination that the received report version number does not match a report version number of the corresponding report identifier.

10. The system of claim 9, wherein the system is further configured to:
- receive, from an administrator device, an authorization for the client device to receive a new report and a new report identifier associated with the new report.

11. The system of claim 9, wherein the system is further configured to:
- determine a bandwidth between the client device and the system; and
- optimize, based on the bandwidth, the sending of the at least a portion of the information.

12. The system of claim 9, wherein the system is further configured to:
- receive, from the client device, a request to update data in the at least a data source.

13. The system of claim 9, wherein each of the at least a data source is any of: a relational database, a non-relational database, a web service, a list of comma-separated values (CSVs), and an image cache.

14. The system of claim 9, wherein the system is further configured to:
- send, to the client device, an instruction to delete the report and the associated report identifier.

15. The system of claim 9, wherein the system is further configured to:
- determine, based on a threshold, whether the at least a portion of information is frequently accessed; and
- upon determining that the at least a portion of information is frequently accessed, store, by the system, the at least a portion of information.

* * * * *